United States Patent [19]

Abadie

[11] Patent Number: 4,638,588
[45] Date of Patent: Jan. 27, 1987

[54] FISH ATTRACTING DEVICE

[76] Inventor: Carole R. Abadie, 3505 Bellah Ct., Irving, Tex. 75062

[21] Appl. No.: 689,136

[22] Filed: Jan. 7, 1985

[51] Int. Cl.⁴ ............................................. A01K 69/06
[52] U.S. Cl. ..................................... 43/44.99; 43/103
[58] Field of Search ....................... 43/44.99, 100, 103

[56] References Cited

U.S. PATENT DOCUMENTS

| | | | |
|---|---|---|---|
| 455,758 | 7/1891 | Moulsong | 43/44.99 |
| 2,607,155 | 8/1952 | Van der Clute | 43/44.99 |
| 2,709,317 | 5/1955 | Pease | 43/44.99 |
| 2,719,382 | 10/1955 | Schachte | 43/44.99 |
| 2,729,912 | 1/1956 | Moffett | 43/44.99 |
| 2,749,647 | 6/1956 | Beloff | 43/42.06 |
| 2,908,993 | 10/1959 | Webb | 43/44.99 |
| 3,031,791 | 10/1959 | Banks | 43/42.06 |
| 3,176,427 | 4/1965 | Hershey | 43/44.99 |
| 3,991,504 | 11/1976 | Pieper | 43/42.06 |
| 4,138,794 | 2/1979 | Chiodini | 43/43.14 |
| 4,373,286 | 2/1983 | Robison | 43/102 |
| 4,434,575 | 3/1984 | Pearson | 43/44.99 |

Primary Examiner—Nicholas P. Godici
Assistant Examiner—Christopher L. McKee
Attorney, Agent, or Firm—Michael D. McCully

[57] ABSTRACT

A fish attracting device is adapted to be submerged into the water below a fisherman's boat or the boat dock. The device has a central section comprising a perforated hollow container for retaining fish bait therein in a manner to permit the fish bait to be dispensed from the container through the perforations. A tray member adapted to be attached to the bottom of the container collects fish food dispensed from the container. The device includes a cylindrical mesh screen mechanism positioned essentially concentrically about the perforated container in a manner to prevent larger fish from direct access to the fish food dispensed from the container and/or collected in the tray below. In this manner, smaller fish may enter the annular space beween the wire mesh screen and the container and feed directly upon the fish food dispensed from the container and collected in the tray below, while larger fish are prevented from feeding directly upon said fish food, and also are prevented from feeding directly upon the smaller fish which are feeding upon said dispensed food. In this manner, the larger fish must rely solely on the only accessible fish food in the immediate area, specifically that attached to the fisherman's hook.

14 Claims, 3 Drawing Figures

FISH ATTRACTING DEVICE

BACKGROUND OF THE INVENTION

The present invention relates generally to apparatus for retaining fish bait therein and submerging the apparatus and fish bait in a manner to permit water to draw out individual particles of fish bait so as to attract fish, and relates more particularly to a device of this nature that further incorporates means for collecting the fish bait withdrawn from the apparatus so that smaller fish might feed on said bait, and further incorporates means for protecting the smaller fish from larger fish while the smaller fish are feeding on the fish bait.

Heretofore various devices have been utilized to lure or otherwise attract fish to a designated area. These devices have generally taken the form of a container of some sort either being formed of a wire mesh type material, or a basically rigid container having sufficient holes therein to permit fish bait to exit the container in order to attract the fish. Some of these devices have been shaped in the form of a fish, and/or included fish hooks positioned thereon (as in the case of lures) in order to snag the fish when the fish attempts to eat the fish bait contained with the device. Others of these devices have simply taken the form of containers for "feeding" the fish in order to attract the fish so that the fishermen might attempt to thereafter catch the fish on individually baited hooks.

These previously used fish attracting devices have the following drawbacks:

(1) The fish food that exits the device falls directly to the lake or stream bottom where it is picked up and eaten by fish attracted to the general area. In so doing, the attracted fish thereby avoid the bait placed upon the fisherman's hook suspended within a certain range of depth (generally the depth of the fish attracting device container) where the fisherman feels he is most likely to attract and catch fish. The fish attracted to the area simply feed on the falling/fallen fish food while avoiding that on the fisherman's hook; and (2) Smaller fish that are attracted to the fish attracting device are eaten by larger fish which, of course, defeats the initial purpose of the fish attracting device by eliminating the smaller fish and preventing them from growing into larger fish, and by satisfying the hunger of the larger fish before the fish has had the opportunity to attempt to eat from the fisherman's hook.

SUMMARY OF THE INVENTION

The present invention provides a novel device for attracting fish which overcomes the problems of fish attracting devices in common use today. According to the invention, the fish attracting device includes a central hollow elongate container having a plurality of holes or slots therein for dispensing fish food contained within the container into the water medium. In a preferred embodiment, the hollow container is cylindrical in shape and includes a circular tray attached to the bottom thereof for catching and retaining particles of fish food that are dispensed from the cylindrical container and fall into the tray. This preferred embodiment also includes a cylindrical wire mesh screen fixed about the cylindrical fish food container in a manner to prevent larger fish from direct access to the fish food contained in the cylindrical container. The cylindrical screen is of a diameter sufficiently larger than the diameter of the tray in order to permit smaller fish to swim therebetween and have direct access to fish food dispensed from the container and food that has collected in the tray. The screen additionally prevents larger fish from eating the smaller fish that have come to feed from the fish attracting device, thereby forcing the larger fish to feed from the fisherman's hook nearby.

BRIEF DESCRIPTION OF THE DRAWINGS

For a detailed description of the preferred embodiment of the invention, reference is made to the accompanying drawings in which.

DETAILED DESCRIPTION OF THE INVENTION

Figure 1:
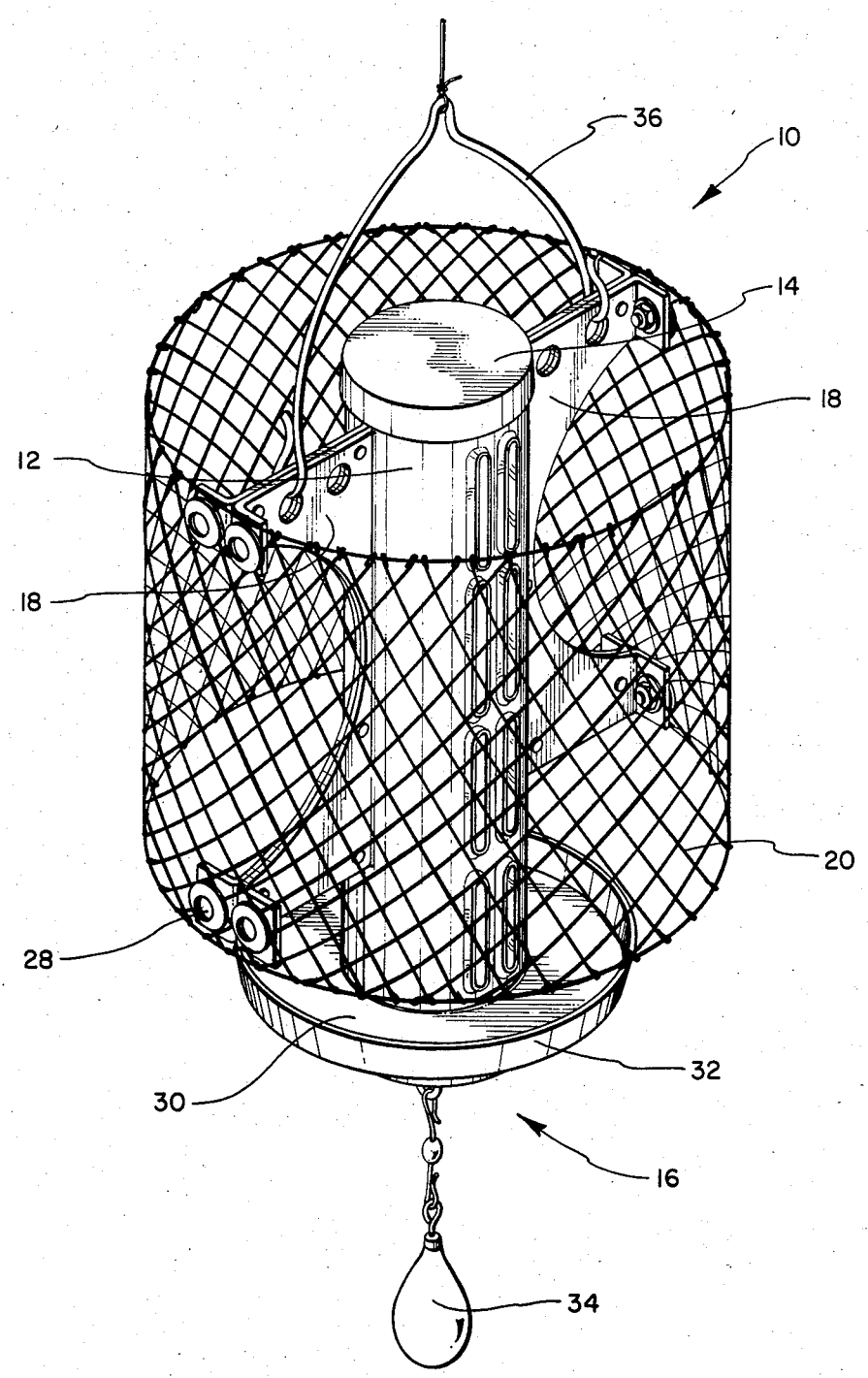
FIG. 1 is a perspective view of the fish attracting device of the present invention.
Figure 2:
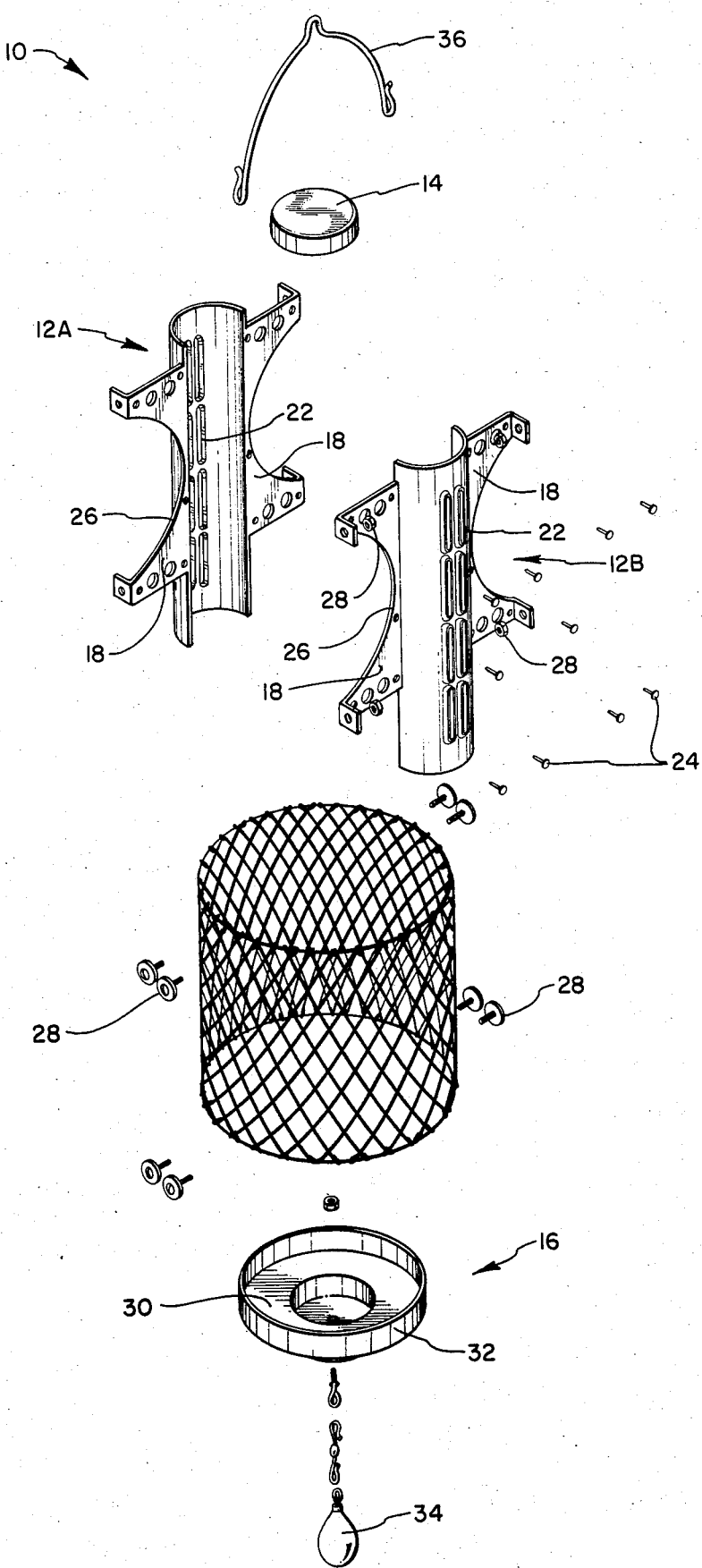
FIG. 2 is a perspective exploded view of the fish attracting device shown in FIG. 1.

Turning now to the drawings, wherein like parts are indicated throughout the specification and drawings with the same reference numerals, and initially to FIGS. 1 and 2, the fish attracting device of the present invention is shown generally illustrated by the numeral 10. The fish attracting device comprises a cylindrical container 12 having an upper cap 14 and a lower tray member 16.

As best shown in FIG. 2, the cylindrical container 12 is formed of two identical halves 12A and 12B which join together to form the enclosed container. Each half of the container 12A, 12B has formed therewith a pair of diagonally opposed wings 18 which, when joined together to form the enclosed container, support a cylindrical wire mesh screen 20. It should be noted that the wings 18 are located closer to one end (the upper end as shown in the drawings) of the cylindrical container 12, which results in the cylindrical wire mesh screen 20 being postioned closer to the top of the container than the bottom of the container. The reason for this is to permit smaller fish to enter the annular space between the bottom of the wire mesh screen 20 and the lower tray member 16 in order to feed on the fish food dispensed from the cylindrical container 12 and/or collected in the lower tray member 16.

As shown in FIGS. 1 and 2, the cylindrical container 12 includes a plurality of elongate apertures or slots 22 formed therein. The purpose of these apertures is to permit fish food to be dispensed from the cylindrical container in order to attract fish, and also, of course, to permit water to enter the cylindrical container to, over a period of time, agitate and flush out the fish food from the interior of the container. The two identical mating pieces 12A, 12B that form the cylindrical container 12 are held together by brads 24 or other suitable means which provide ease and simplicity of construction.

As shown, the diagonally opposed wings 18 are each formed with a semi-circular edge 26 defining a semi-circular cutout. As those skilled in the art will readily appreciate, the primary function of the opposed wings 18 is to support the wire mesh screen 20 generally concentrically with the cylindrical container 12 at a spaced distance therefrom. Therefore, it is preferable that the wings 18 not occupy the full space between the container and the screen, so that water may freely flow around the container, and small fish may freely swim around the container, virtually unhampered or unrestricted by the wings 18.

Referring again to FIG. 2, the wire mesh screen 20 is affixed to opposed wings 18 by a plurality of fastening devices 28 which, in this embodiment take the form of screws or bolts, large flat washers, and nuts. Of course, any suitable fastening device may be utilized to retain the wire mesh screen in proper position about the cylindrical container 12.

The lower tray member 16 is preferably permanently attached to the cylindrical container 12, forming a permanent bottom thereto. The tray member 16 is formed with an annular surface 30 and a cylindrical ridge 32. The tray member 16 may also be formed with a weight mechanism 34 connected thereto in an appropriate fashion to maintain the fish attracting device 10 in generally vertical alignment when in use below the water surface. The upper cap 14 is designed to be easily removed from the cylindrical container 12 in order to provide convenient access to the interior of the container for replenishing the container with fish food as required. Although shown in FIGS. 1 and 2 as a simple press fit, the upper cap 14 may include any convenient screw or latch mechanism for attachment to the container. A wire or a metal brace 36 is attached to the wings 18 of the device, which brace is then attached to a small rope or chain for suspending the device in the water and positioning the device at a predetermined depth below the water surface.

OPERATION

The fish attracting device of the present invention may be available either as an assembled unit, as shown in FIG. 1, or may be purchased as a kit of individual pieces, as shown in FIG. 2, to be assembled by the purchaser. In either instance, of course, the operation of the device to attract fish is the same. The fisherman fills the cylindrical container as desired with suitable solid or semi-solid pieces of fish food. Those skilled in the art will appreciate that the particular type of fish food used should be suitable to, over a period of time, be washed or flushed from the container through the elongate slots. Next, with the cap 14 securely fastened to the container 12, the fisherman slowly lowers the device 10 into the water to a prescribed depth below the water surface. In this regard, the fish attracting device may be suspended from a boat located a distance from the lake shoreline, or may be used with equal efficacy suspended from a dock or boat ramp to the prescribed water depth.

Water rushing into the cylindrical container through the elongate slots will agitate the fish food therein, causing a small quantity to be washed out through the slots, some of which falls to the tray member, below. Of course, whether the fish food remains within the container or is dispensed through the elongate slots, the odor thereof permeates the immediate area thereby attracting fish to the general area desired by the fisherman.

With the device positioned at the proper depth, smaller fish attracted to the device may enter the annular space between the cylindrical container and the wire mesh screen in order to feed directly upon the fish food dispensed from the container that has fallen into the lower tray member. The wire mesh screen protects the smaller fish from being eaten by larger fish that are attracted to the device, and more importantly, prevents the larger fish from direct access to the fish food dispensed from the container and collected in the lower tray. Of course, a small amount of fish food will generally fall from the tray to the lake or stream bottom. However, this amount is negligable as compared to that amount of fish food that is retained in the tray at the desired depth below the water surface. Because the larger fish are prevented from feeding directly upon the fish food dispensed from the container and collected in the tray, they are forced to feed upon fish food that is attached to the fisherman's hook, which is also positioned at a water depth coincident with the fish attracting device. In this manner, the fisherman can quite well control the depth of the fish attracting effect by preventing the fish food from falling to the lake or stream bottom.

From time to time throughout the course of a fishing excursion, the fisherman may want to give a series of tugs or pulls to the line or chain suspending the fish attracting device in the water. The effect of this is to further agitate the fish food within the container to dispense more of the fish food through the elongate slots to enable direct access thereto by the smaller fish. More importantly, however, the agitation increases the permeation of the fish food odor into the water surrounding the fish attracting device. Of course, the fisherman may at any time retrieve the fish attracting device and replenish the fish food therein as desired.

ALTERNATIVE EMBODIMENT

Figure 3:
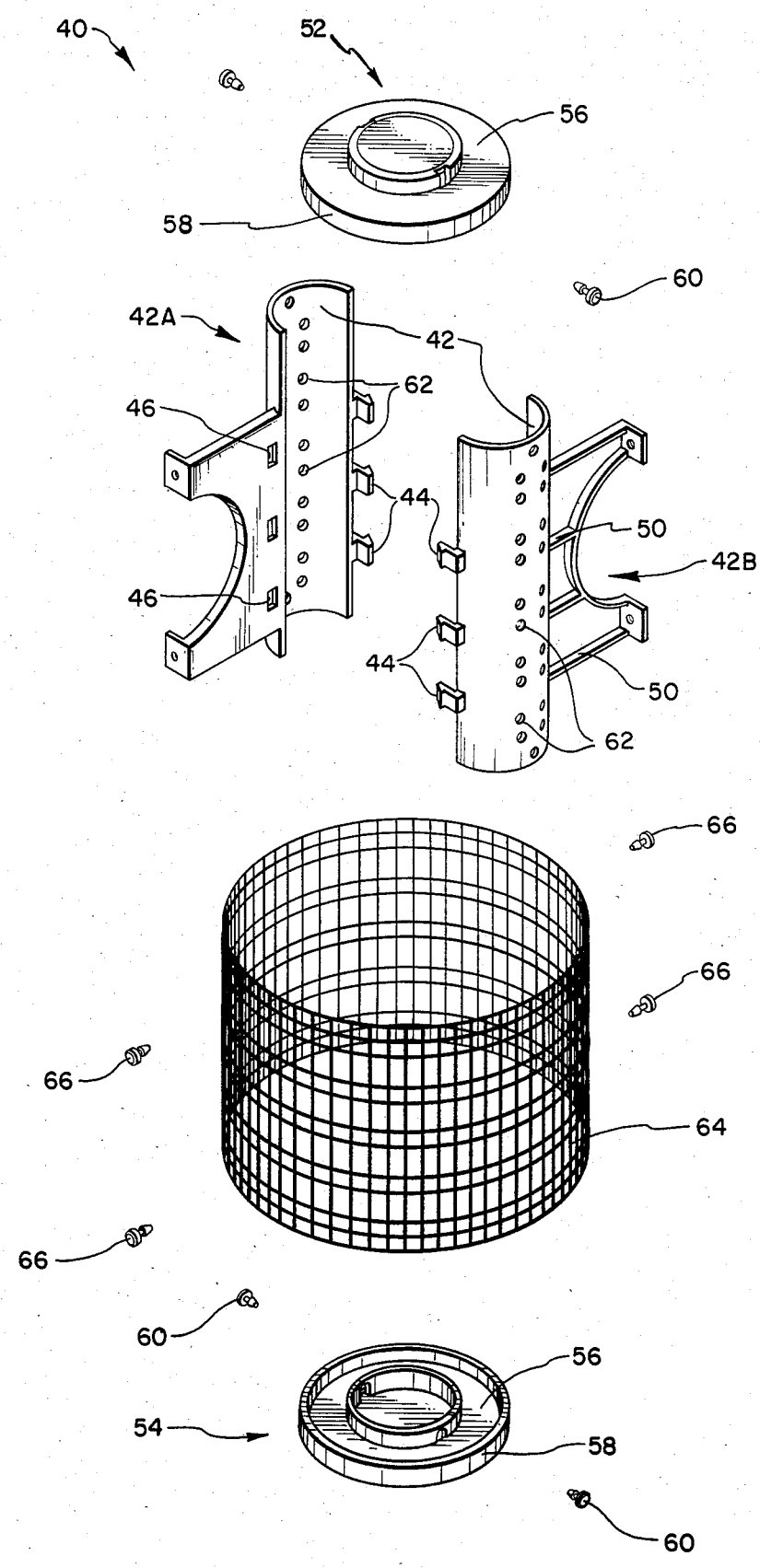
FIG. 3 is a perspective exploded view of an alternative construction of the fish attracting device of the present invention.

Turning now to FIG. 3, an alternative embodiment of the fish attracting device of the present invention is shown in exploded pictorial form, generally designated by the numeral 40. As shown, this alternative embodiment 40 is comprised of two identical semi-cylindrical sections 42A, 42B that mate together to form the cylindrical container 42. The two cylindrical container sections are adapted to be snap-fitted together by the use of a plurality of snap or latching tabs 44 that fit into mating slots 46. When so assembled, the cylindrical container 42 also includes diagonally opposed wings 48, shaped essentially the same as the diagonally opposed wings 18 of the embodiment shown in FIGS. 1 and 2. Because the wings 48 in the FIG. 3 embodiment do not mate with identical wings, as shown in FIGS. 1 and 2, the wings 48 are provided with structural ribs 50 to impart a structural integrity to the device when assembled.

As in the embodiment shown in FIGS. 1 and 2, this alternative embodiment shown in FIG. 3 includes upper and lower caps 52, 54, respectively, which are basically identical in form, each having an annular portion 56 and cylindrical ridge 58. The upper and lower caps 52, 54 are connected to the cylindrical container 42 by snap-type pins 60. Each semi-cylindrical section 42A, 42B is formed with a plurality of circular holes 62 that function to dispense the fish food from the container, and to permit water to enter the container to gradually flush out the container. The alternative embodiment of the fish attracting device 40 also includes a cylindrical wire mesh screen 64 that attaches to the diagonally opposed wings 48 by snap-type pins 66 identical to those 60. The cylindrical screen 64 is positioned about the housing 42 in a manner and location essentially identical to that of the device shown in FIGS. 1 and 2, and serves an identical function. The inventor has found that by forming the semi-circular sections 42A, 42B to be identical, the upper and lower caps 52, 54 to be identical and the snap-type pins 60, 66 to be identical, the cost of manufacture of the embodiment shown in FIG. 3 is greatly reduced. Additionally, by using the circular holes 62 in the container 42 rather than the elongate slots used in the embodiment shown in FIGS. 1 and 2, an additional savings in the manufacturing cost of the container sections 42A is effected, without adversely affecting the flow of water into the container or the dispensing of fish food from the container.

Although it is contemplated that the major components (container sections, top and bottom caps, mesh screen) of both embodiments shown be constructed of a plastic material, it should be obvious that any of these (particularly the screen) may also be constructed of metal.

Those skilled in the art will readily appreciate that the overall concept of the fish attracting device of the present invention is particularly advantageous in attracting fish of all sizes, while simultaneously protecting the smaller fish and preventing the larger fish from feeding directly upon the fish food contained within the device. In this manner, larger fish are forced to feed directly on food that is attached to the fisherman's hook, thereby greatly increasing the fisherman's chance of catching the larger fish, while simultaneously protecting smaller fish from being eaten by larger fish.

Although a preferred embodiment and an alternative embodiment of the present invention have been disclosed in detail herein, it will be understood that various substitutions and modifications may be made to the preferred and alternative embodiments described herein without departing from the scope and spirit of the present invention as recited in the appended claims.

What is claimed is:

1. Apparatus for attracting fish, comprising:
   (a) A hollow container for retaining fish bait therein, said container having first and second open ends and at least one aperture therein for permitting fish bait to exit said container;
   (b) A first closure member for attachment to said first end of said container for closing said first end;
   (c) A second closure member for attachment to said second end of said container for closing said second end;
   (d) A solid tray member mounted with said second end of said container for collecting fish bait that exits said container; and
   (e) a single cylindrically shaped open ended mesh screen mounted substantially concentrically about said container by diametrically opposed support structures extending radially from, and formed integrally with, said container, spacing said screen from said container whereby smaller fish may freely swim through said screen, as well as around the screen through said open ends, and may freely feed on accesible fish bait within said container and on fish bait collected in said tray, but wherein said screen prevents larger fish from feeding on fish bait within said container, fish bait collected in said tray, and smaller fish within the interior of said screen.

2. The apparatus as set forth in claim 1, wherein said container is elongate.

3. The apparatus as set forth in claim 2, wherein said first closure member is removable.

4. The apparatus as set forth in claim 3, wherein said second closure member is removable.

5. The apparatus as set forth in claim 3, wherein said tray member is formed with said second closure member, said tray member being essentially concentric with said second closure member.

6. The apparatus as set forth in claim 5, wherein said support structures include a pair of diametrically opposed wing members.

7. The apparatus as set forth in claim 6, wherein said screen is of a mesh opening size sufficient to prevent larger fish from direct access to the fish bait contained within said container.

8. The apparatus as set forth in claim 7, wherein when said apparatus is positioned essentially vertically with said first end at the top, said tray is positioned below and outboard of said container.

9. The apparatus as set forth in claim 8, further comprising a weight member attached to said second closure member.

10. Apparatus for attracting fish, comprising:
    (a) An elongate, hollow container for retaining fish bait therein, said container having a first open end and a second closed end, said container including a plurality of apertures therein for permitting said fish bait to exit said container;
    (b) A closure member removably attached to said container first end for permitting access to the interior of said container;
    (c) A solid tray member mounted with said container second end for collecting fish bait that exits said container; and
    (d) A single cylindrical open ended mesh screen mounted around said container and spaced from said container by diametrically opposed support structures extending radially from, and formed integrally with, said container, spacing said screen from said container whereby smaller fish may freely swim through said screen, as well as around said screen through said open ends, and may freely feed on accessible fish bait within said container and on fish bait collected in said tray, but wherein said screen prevents larger fish from feeding on fish bait within said container, fish bait collected in said tray, and smaller fish within the interior of said screen.

11. The apparatus as set forth in claim 10, wherein said support structures include a pair of diametrically opposed wing members.

12. The apparatus as set forth in claim 11, wherein said tray member is circular in shape and concentric with said container second end, and is positioned relative to said screen to permit smaller fish to enter the area between said container and said screen.

13. Apparatus for holding fish bait to attract fish, said apparatus comprising:
    (a) An elongate, hollow, cylindrical container for holding fish bait therein, said container having first and second ends, and having a plurality of apertures therein for permiting said fish bait to exit said container;
    (b) A first closure member for removably attaching to said container first end;
    (c) A second closure member mounted with said container second end, said second closure member having a solid tray formed concentrically therewith for collecting fish bait that exits said container;
    (d) A pair of diagonally opposed wing members formed with said container, and extending essentially radially from said container; and
    (e) A single essentially cylindrical open ended mesh screen mounted essentially concentrically about said container, and spaced therefrom by said wing members, whereby smaller fish may freely swim through said screen, as well as around the screen and may freely feed on accessible fish bait within said container and on fish bait collected in said tray, but wherein said screen prevents larger fish from feeding on fish bait within said container, fish bait collected in said tray, and smaller fish within the interior of said screen.

14. The apparatus as set forth in claim 13, wherein said second closure member is removable from said container second end.

* * * * *